A. Destouy.
Sewing Machine.
Sheet 1. 3 Sheets
№ 3635.
Reissued Sep. 7. 1869.
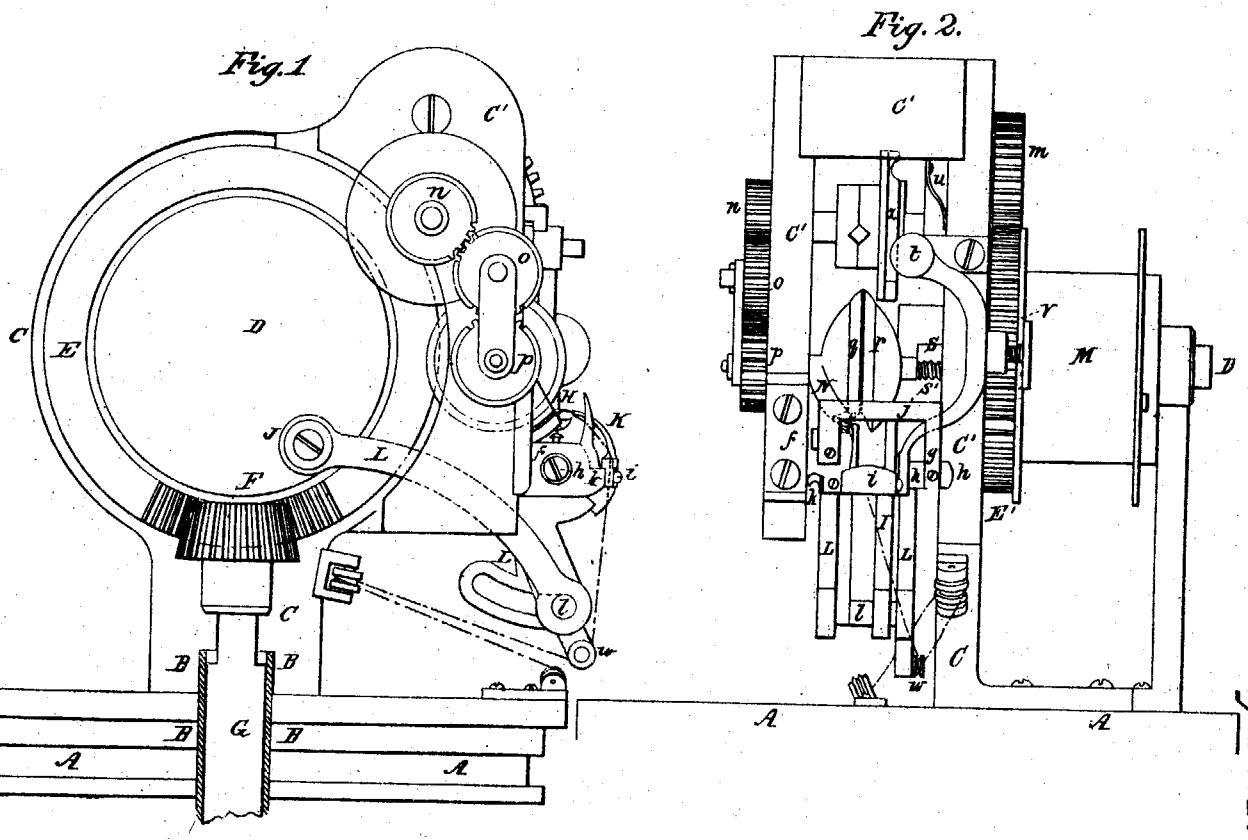
Inventor:
Aug. Destouy by
A. Pollak his atty

A. Destouy.
Sewing Machine.
Sheet 2. 3 Sheets.
№ 3635.
Reissued Sep. 7. 1869.
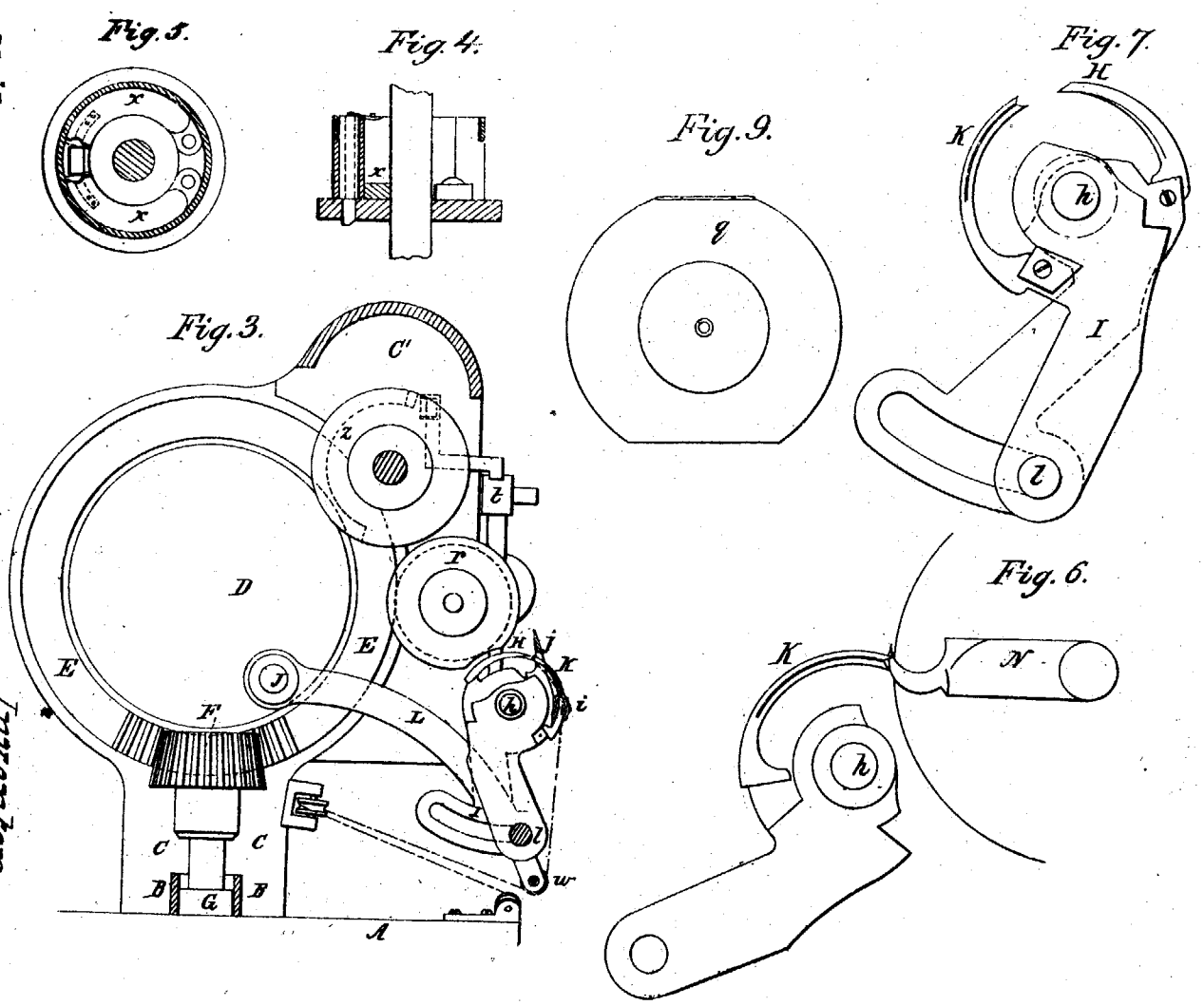
Witnesses.
Wm. H. Harrison.
E. Kingman.
Inventor.
Aug. Destouy by
A. Pollak his Atty.

Sheet 3. 3 Sheets
A. Destouy.
Sewing Machine.
No. 3635. Reissued Sep. 7. 1869.
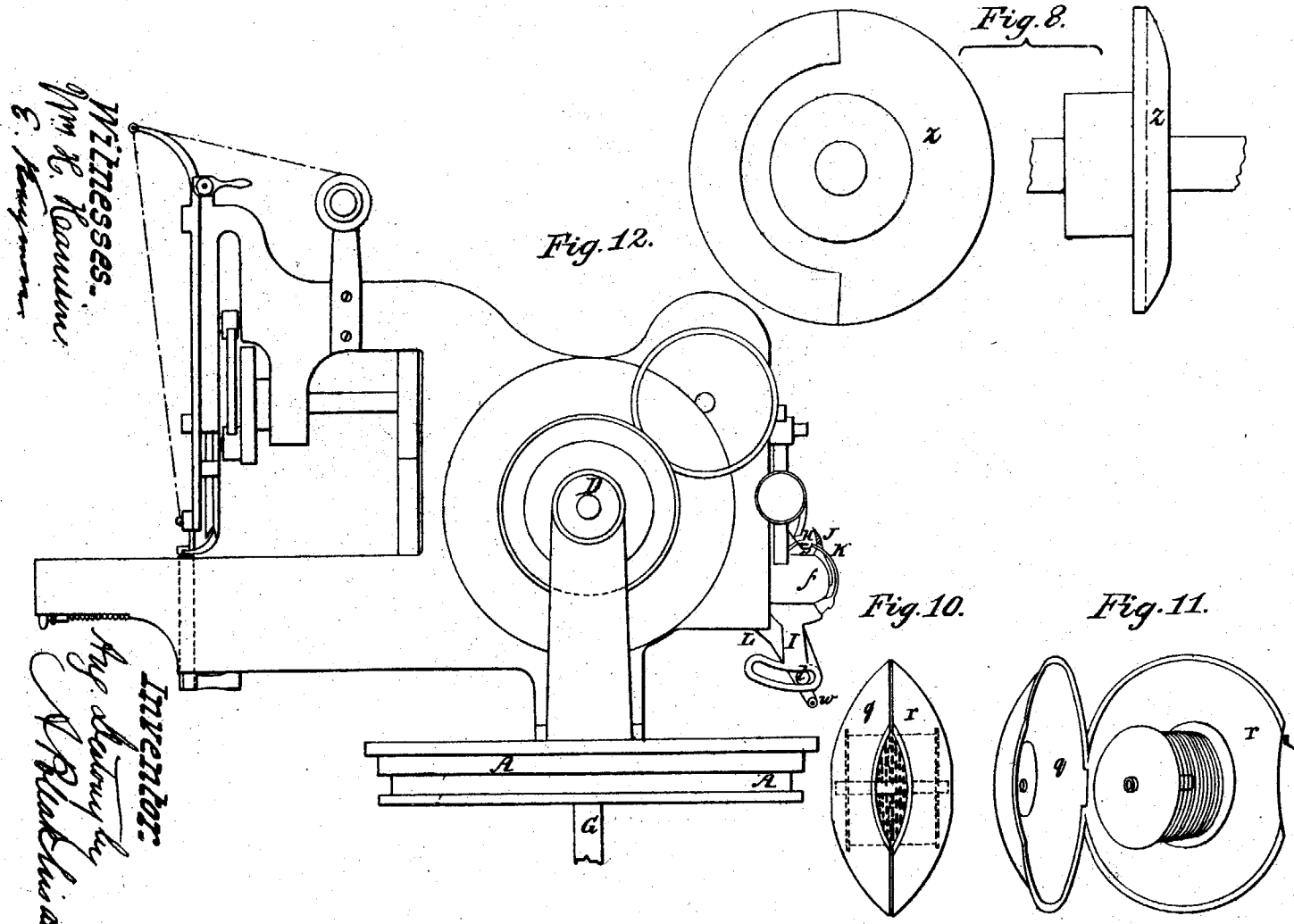
Witnesses.
Wm. H. Kearnim
E. Kaufman
Inventor:
Aug. Destouy by
A. Pollak his Atty.

UNITED STATES PATENT OFFICE.

CHARLES GOODYEAR, JR., FRANCIS DU BOIS, FREDERICK RENAUD, AND HENRY T. CLOSE, OF NEW YORK, N. Y., ASSIGNEES OF AUGUSTUS DESTOUY.

IMPROVEMENT IN SEWING-MACHINES FOR BOOT AND SHOE SEWING.

Specification forming part of Letters Patent No. 34,413, dated February 18, 1862; reissue No. 3,635, dated September 7, 1869.

*To whom it may concern:*

Be it known that AUGUSTUS DESTOUY, of the city, county, and State of New York, invented certain new and useful Improvements in Machinery for Sewing Boots and Shoes and other like articles made of leather or other similar substances; and the following is hereby declared to be a full, clear, and exact description of the same, reference being had to the accompanying drawings.

Figure 1, of Sheet 1, is a side elevation of a machine made in accordance with this invention. Fig. 2 is a front elevation, and Fig. 3 a sectional elevation, of the machine. Figs. 4, 5, 6, 7, 8, 9, 10, 11, are detailed views; and Fig. 12, a double machine, arranged for the uniting of soles with their uppers, as well as for the sewing of other kind of work in shoemaking, saddlery, &c. In Sheet No. 2, the Figs. 1, 2, 3, 4, 5, and 6 represent, respectively, side, front, and rear elevations, plan and detail views of a machine constructed according to the principle of this invention, but modified so as to be adapted to the sewing or stitching of such parts of articles made of leather, &c., which require the work to be laid on a sewing-table while being fed across the sewing mechanism.

The main feature of this invention relates to machinery for the production of welted boots or shoes; and it may be stated to consist, first, in the combination, in a sewing mechanism, of a needle, or equivalent instrument, for carrying the thread through the material to be sewed, with an awl or other instrument for first piercing the hole in the material through which the thread is to be passed, both said instruments having motion upon a common center of revolution or oscillation. Second, in the combination with the thread-carrying device and piercing-instrument, both operating upon a common axis of oscillation, of a support for holding in the path of both the work to be sewed. Third, in the oscillatory needle or awl-stock, driven by direct and positive action of the driving mechanism, so that the needle may describe an arc of a circle, not less than thirty degrees. Fourth, in combining the sewing-mechanism with the support for the work to be sewed, under such an arrangement that the seam uniting the upper and the sole may be made through only part of the thickness of the sole. Fifth, in the arrangement of the support so as to serve, first, as a rest for the work; second, as a sewing-gage, to regulate the distance of the stitches from the upper or from the edge of the sole; and third, as a guard or shield, to prevent the awl and needle from being injured themselves, and from marking or injuring the upper. Sixth, in the combination, in a sewing mechanism, of a circularly-curved awl or piercing instrument, with a circularly-curved needle, operating as hereinafter explained.

To enable others skilled in the art to make and use this invention, the manner in which the same is or may be carried into effect will now be explained by reference to the accompanying drawings.

The frame of the machine is here shown cast in one piece, with a base-plate, A, capable of rotation on a pivot-sleeve, B, and consisting, first, of an upright round disk, C, through the center of which passes the axle D of the main cog-wheel E, which receives its motion from the prime mover through the pinion F, fast on the head of the main shaft G, and imparts such motion to the operative parts of the machine; second, of a standard-casing, C, in front of the disk that incloses the sewing and feeding mechanism proper. To the front part of the frame-work are attached two brackets, *f* and *g*, fitted with bearings to hold the axle *h*, in such a manner as to allow of its reciprocating play in the direction of its length, and of its revolution around its axis. One of the brackets, and preferably the one toward the left of the operator, is provided with the support *i*, for the material to be sewed to rest upon while it is being sewed, and *j*, whose function it is to prevent the awl from being bent or broken, and to give a support to the upper while it is being united with the welt and the sole, it being understood that the ledge formed in the sole rests, during this operation, upon the front bar of the support. The support *i*, which holds the work to be sewed in the path of the piercing and thread-carrying instruments, is composed of two bars, between which the needle and awl play, and the innermost bar is slightly higher than the outer one, so as to form a gage, against which the work can be pressed when the outer sole is to be attached, and along which it can follow, and thus cause to be formed a seam parallel with the edge or channel cut for the purpose.

These parts thus constitute a support for the work to be sewed, and serve, at the same time, to protect the needle and awl, as well as the uppers, from injury, and to form a guide or gage to determine the distance from the upper, or from the edge of the sole, that the needle and awl shall enter in performing their work.

The support here shown is peculiarly adapted to the sewing of soles; and it consists of two bars, slightly curved on top, leaving an intermediate space between them, which is wide enough to allow of the awl, after it shall have penetrated the materials to be sewed, to slide sidewise within the two bars a distance equal the length of the stitches.

At the outer end of the support a hook, *k*, may be applied, for the attachment to it of the end of the under thread, if two threads be used, and it is so arranged, in relation to the slot in the support, that the thread, when brought under proper tension, shall cross, within the slot, the path of the forked needle.

The sewing mechanism here shown consists of the following three principal moving parts, viz:

First, the awl or piercing-instrument H, curved concentrically with the shaft *h*, upon which the oscillating lever or awl-stock I, which carries the awl, is mounted. This awl-stock is actuated from the main cog-wheel or disk by means of a rod connected therewith eccentrically, at J, the other end of said rod being provided with a transverse pin, having play within the curved slot in the end of the awl-stock, so that when rotary motion is given to the disk-wheel E, the pin *l*, on the connecting-rod, will first lodge in the extreme recess in the rear of the curved slot of the awl-stock, and carry the lever-end backward, and thereby cause the awl to penetrate the material to be sewed. At this moment, and while in the leather, the awl is caused to travel sidewise, being actuated by a feed-bar, which constitutes part of the feeding mechanism, of which mention will hereafter be made. During this lateral motion the connecting-rod is pushed forward, its pin advancing in the slot of the lever, without, however, imparting motion to it until it reaches the front end of the slot, when, by its further forward motion, it causes the awl to disengage from the material, and to reassume the position which it is to occupy previous to its again piercing the leather or material to be sewed.

Second, the needle or thread carrying device K, a penetrating though not piercing instrument. It is arranged so as to act in a direction opposite to the direction in which the awl acts—that is to say, supposing the awl to enter the work from the upper side, as it does in the present case, the needle, as the awl is withdrawn, enters and passes up through the work from the lower side. It is attached to a needle stock or lever, (see Fig. 6,) which, in this instance, is mounted upon the same shaft *h* as that upon which the awl-stock is mounted, so that both needle and awl have motion around the same center of revolution or oscillation. The longer arm of the needle-stock is connected with the rod L, and the needle is operated in the same manner as the awl, except that it has no sliding motion. The needle is curved concentrically with its center of oscillation, and its point, in the present instance, is forked in such a manner as to seize within its recess the under thread, or the thread fed from the bobbin M, when stretched across the opening in the support.

It will be seen that for the purposes of the work which this machine is designed to perform, particularly when applied to the sewing of the welt to the inner sole, which necessitates that the needle shall pass through part of the thickness of the sole, instead of passing through the whole thickness, the needle and awl should travel in a curvilinear path of such extent as to describe an arc of a circle not much less than thirty degrees. To this end the piercing and thread carrying instruments are curved concentrically, each with its center of oscillation, and the stocks or levers to which they are attached receive the direct application of, or are directly connected with, the driving-mechanism. By such means great power is obtained, and both awl and needle can travel through their extended path, and are driven with ease through material which it would be otherwise difficult, if not impracticable, to penetrate.

With the employment of instrumentalities, such as above described, it is practicable to make by machinery a welted boot or shoe. By their use, the welt, upper, and insole can be sewed together, and the welt and outer sole united in substantially the same manner in which these operations are performed by hand, such results being due to the peculiar movement of the piercing and thread-carrying instruments. And so, also, in sewing the sole and upper, the seam can be made through only part of the thickness of the sole, both awl and needle entering the channel usually formed therein, as will be fully understood by those acquainted with the art to which this invention relates.

Third, the rotary hook N derives its motion from the main wheel, through the medium of the series of gear-wheels *m*, *n*, and *o*, which latter communicates the motion to the shaft on which the hook is mounted. The shank of the hook is shaped to conform with the stationary lentiform thread-case, around which it is caused to travel; and the hook is arranged to operate in conjunction with the forked needle, so that the thread carried through the material to be sewed is seized by it, and, in the form of a loop, is carried over and around the thread-case.

Besides these parts, which constitute the principal elements of the sewing mechanism, there is a thread-case, and a feeding and thread-controlling device, which will now be described: The thread-case is composed of two shells, *q r*, hinged together and open at one side, so that the spools which the case is intended to contain may at any time be seen. One of the shells is perforated for the passage of the thread. The case is held loosely in position by means of two side cups, the one slightly pressing the case against the other. The second cup is rendered adjustable by means of the bar working in the bracket *s*, to which it is securely fixed by means of the set-screw *s'*. The thread, when taken off the forked needle, is carried over and around the lenticular case, by passing between its holding-cups.

The feeding mechanism may vary according to the kind of work, and to conform with the general arrangement of the machine. In this machine it is similar to what is known as the needle-feed, and may be termed, in connection with the machine, the "awl-feed."

To the shaft carrying the gear-wheel *m* is attached a cam-disk, *z*, located within the front part of the standard-frame. This cam-disk is constructed to actuate the short end of the feed-bar, and thereby cause the said bar to vibrate on the pivot *t*. The lower end of the feed is shaped into a fork, which embraces the rocking-shaft, upon which, as axis, the awl and the needle rotate. A spring, *u*, is provided to bear the short end of the feed-bar against the cam-disk, and a set-screw, *y*, located in a suitable position, is arranged to limit the stroke of the feed-bar.

By turning, therefore, the main cog-wheel E, rotary motion will be imparted to the cam-disk, which, in its turn, will vibrate the feed-bar between the limits determined by the position of the cam-disk and that of the set-screw. By turning the set-screw to the right or left, it may be made to project more or less, and thereby give the bar more or less vibratory travel. The forked end of the feed-bar bears against the side of the awl-stock, which, being free to slide laterally upon its axis, is thus caused to effect the feed.

The cam-disk being timed to actuate the feed-bar when the awl shall have penetrated the material to be sewed, it will be understood that the material is dragged sidewise a distance determined by the length of the stitches.

The lateral movement of the awl is determined, first, by the stop or set-screw, which fixes the limit of its back-stroke; second, by the cam-disk, which causes it to advance, and, when at its extreme stroke, to remain stationary until the forked needle, which is now directly opposite the awl, shall have come up to the material. As the needle advances the awl recedes, and thereby allows the needle with its thread to come up through the hole punched by the awl.

The thread on the needle forms an open loop, which is caught by the rotary hook N the moment the needle has reached the extreme end of its upward and forward motion. The loop, thus caught by the rotary hook, is distended by being brought into contact with the curved surface of the lenticular case, and, by being thrown over the stationary thread-case, takes up the loose thread supplied by said case, and is locked by the under-thread loop being drawn up in the following manner: The under thread, which is wound over a large bobbin, M, is properly conveyed over a system of pulleys or other guiding devices, to the eye W, in the end of the lever L.

The operation of the parts is such that the eye with its lever occupies the extreme position in rear when the loop is cast off the thread-case. At this moment the lever advances, and by so doing draws on the loose thread of the disengaged loop, and takes up the slack. To better insure this action and to prevent the friction of the thread in the material from overcoming the tension of the thread derived from the bobbin, whereby, instead of taking up the slack it would draw more thread from the bobbin, the latter receives increased friction during the time the awl-lever is engaged in drawing up the slack thread. This is effected by the employment of an internal friction-brake, shown in Figs. 4 and 5, and operated from the outside by means of a latch, or its equivalent.

The friction device consists of two hinged clamps, *x*, clasping the shaft, or a sleeve, fast on said shaft, when expanded by a wedge driven or pushed in from the outside.

In the accompanying drawings, the wedge is shown operated by a latch, beveled on one side, so that it will be depressed and operate the wedge when the gear-wheel is rotated in its proper direction, but will stop the machine when rotated in the contrary direction.

Instead of this friction-drum, other devices may be employed, or, indeed, friction devices, as applied to the bobbin, may be dispensed with altogether.

A second lever, or any other take-up or thread-controlling device may be used as well, and, in some instances, with better effect.

In Fig. 12 is shown the machine complete, and combined with an ordinary sewing-machine, or a sewing-machine constructed according to this invention, but differently arranged, so as to be adapted to stitching, &c.

In the several figures in plate 2 is represented a machine modified as last hereinbefore mentioned. The stationary thread-case with its rotary carrier is located underneath the table. The hook is fixed upon a hollow shaft, which is mounted and rotates on the cup-spindle. The middle gear-wheel *b* transmits the movements to the upper and lower gear-wheels *a* and *c*, which operate, respectively, the needle-bar and the rotary hook and feed-wheel. The latter is actuated by a vibrating lever, *d*, whose motions are derived from an eccentric, *e*, fast on the hook-shaft.

The two machines may be mounted in one frame, and upon one plate, and movement may be transmitted to either from one pinion.

Having now described the nature of these improvements, and the manner in which the same are or may be carried into effect, what is claimed as the invention of the said AUGUSTUS DESTOUY, is as follows:

1. The combination, in a sewing mechanism, of a needle, or equivalent instrument, carrying the thread through the material to be sewed, with an independent piercing-instrument, when both have motion upon a common center of oscillation or revolution, substantially as set forth.

2. The combination of a needle and an awl or piercing-instrument, both operating on a common axis of revolution or oscillation, with a support holding in the path of both the work to be sewed, substantially as set forth.

3. The oscillatory needle or awl stock, driven by the direct and positive action of the driving mechanism, so that the needle may describe an arc of a circle not less than thirty degrees, substantially as and for the purposes described.

4. A sewing mechanism, adapted to unite, by machinery, the upper, welt, and sole, substantially as described, so as to produce a machine-made welted boot or shoe.

5. The combination of a sewing mechanism and a support for the work to be sewed, arranged, in relation to each other, substantially as described, so that the seam uniting the upper and the sole may be made through part of the thickness of the sole.

6. The support, arranged substantially as herein shown and described, so as to serve as a rest upon which the work will slide, a sewing-gage to regulate the distance of the stitches from the upper or from the edge of the sole, and also as a guard or shield, to prevent the awl and needle from marking or injuring the surface of the uppers, substantially as set forth.

7. The combination, in a sewing mechanism, of a circularly-curved awl with a circularly-curved needle, substantially as and for the purposes described.

In testimony whereof we have hereunto set our hands in the presence of two subscribing witnesses.

CHAS. GOODYEAR, JR.
FRANCIS DU BOIS.
FREDERICK RENAUD.
HENRY T. CLOSE.

Witnesses:
JOHN H. HICKS,
WILLIAM GIBBONS.